July 22, 1947.  L. J. ROSA  2,424,419
ACCESSORY FOR FISHING RODS
Filed June 23, 1945
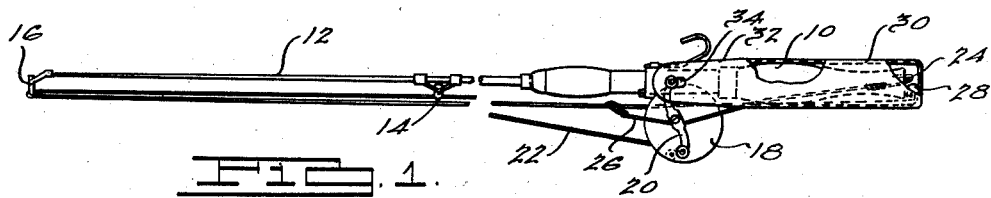
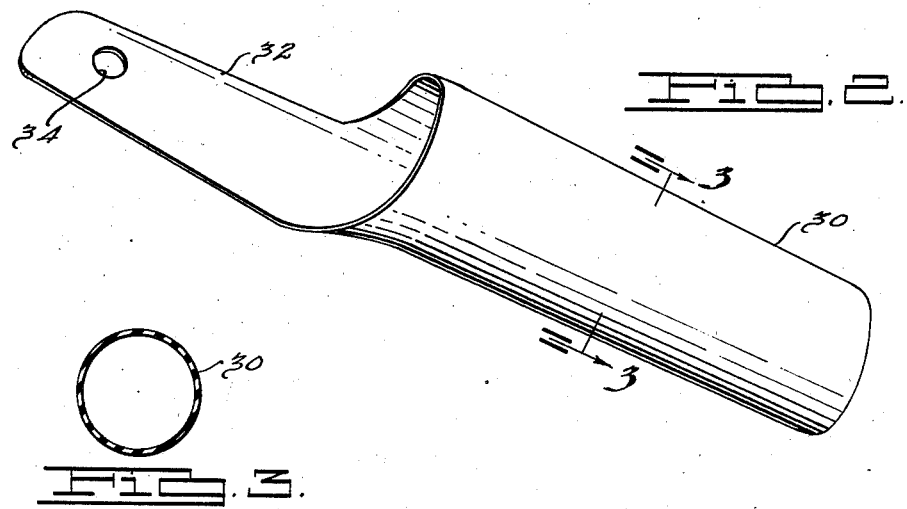
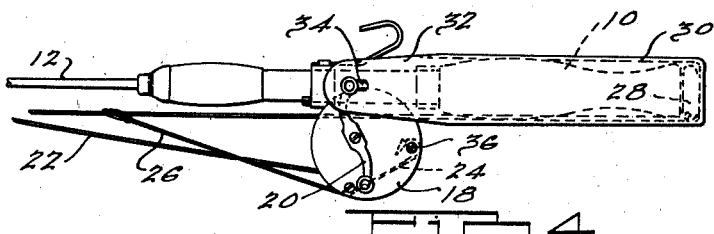
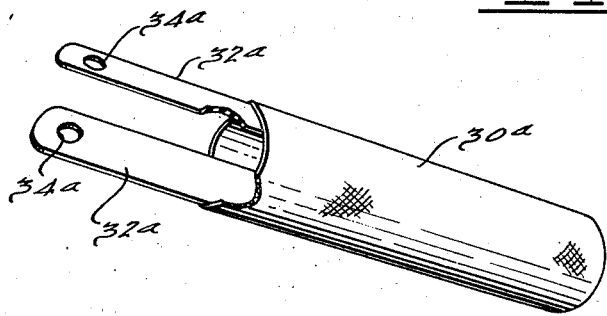
INVENTOR.
Leonard J. Rosa.
BY
Harness, Dickey & Pierce.
ATTORNEYS.

Patented July 22, 1947

2,424,419

UNITED STATES PATENT OFFICE 2,424,419

ACCESSORY FOR FISHING RODS

Leonard J. Rosa, Detroit, Mich.

Application June 23, 1945, Serial No. 601,222

8 Claims. (Cl. 43—33)

This invention relates to fishing rods and associated reels and lines and particularly to an accessory therefor which will prevent two or more rod and reel assemblies which are stacked together from getting their respective lines tangled with each other, and at the same time it may be employed to provide a protecting covering for the associated fishing hook or hooks under certain conditions.

Objects of the invention include the provision of an accessory for a fishing rod equipped with a reel and line for holding the line taut when not in use so that in event it becomes caught on some other object the line will not be withdrawn from the reel; the provision of a device of the type described which, when applied to a rod assembly provided with a hook and the hook is partially imbedded in the handle of the rod, will protect the hook from contact with other objects as well as to maintain the line taut; the provision of a device of the type described including an open ended container adapted to enclose the handle of a fishing rod having a reel assembled thereto, and provided with an elastic strap or extension adapted to be engaged with the handle of the reel so as to hold the handle against turning, and when the assembly includes a line and the free end of the line is anchored to the handle portion of the rod or a part carried thereby, it may be employed to maintain the line under tension; the provision of a device of the type described in which the container and the strap or extension are both formed from elastic and stretchable material such as rubber; and the provision of a device of the type described in which the container is provided with a pair of elastic straps or extensions.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a partially broken, side elevational view of a casting rod provided with a reel mounted thereon and having the fishing line extended through the guides in operative relation with respect thereto, showing a preferred embodiment of the present invention in operative relation with respect thereto;

Fig. 2 is an enlarged perspective view of the device of the present invention employed in the construction shown in Fig. 1;

Fig. 3 is a slightly reduced transverse sectional view taken on the line 3—3 of Fig. 2;

Fig. 4 is a fragmentary view similar to that shown in Fig. 1 but illustrating the use of the present device where the hook is hooked onto the reel and the sinker is positioned within the container of the present invention; and, Fig. 5 is a perspective view, of a modified form of construction in which the container itself is formed from a fabric and provided with a pair of strap members extending from the open end thereof.

When fishing with a rod equipped with a reel it is common practice for the user, when his fishing activities are interrupted momentarily or longer, to engage the hook on the end of the line with the handle or the reel and to wind the reel up until the line is taut. Usually the click of the reel is set in operative condition so as to resist unwinding of the reel should the line get caught on some other object in such a manner as to tend to withdraw the line from the reel, particularly where a group of fishermen are fishing together and temporarily discontinue their activities as a whole, as for instance for the purpose of eating their lunch together, it is common practice to stand their reels in a group and in such case it is a common occurrence for one of the reels to fall down, bringing the others with it. Under such circumstances the lines from one or more of the reels are unwound in spite of the application of the clicks, the hooks often become freed from the reel or the handle, and a tangle results which causes a waste of time and much discomfiture. Furthermore, it is a common occurrence for a fisherman when transferring his fishing activities from one position to another an insufficient distance to warrant dismantling the rod and the reel to similarly arrange his line and hook. Under such conditions in walking or otherwise moving from one position to another the line may become caught on a tree branch or some other foreign object and unwind the line from the reel, often causing the hook to become freed from the reel or handle and to catch on some other object, all of which is inconvenient. The primary purpose of the present invention is to provide an exceedingly simple device whereby occurrences of the above described nature are completely eliminated.

Referring now to the accompanying drawing and particularly to Fig. 1 there is shown a fishing rod having a handle structure indicated generally at 10 secured to one end of a conventional rod 12 equipped with the usual guides 14 and 16. A conventional type of fishing reel 18 is conventionally mounted upon the handle 10 and is provided with a conventional operating handle 20. The fishing line 22, which is wound up on the reel extends through the guides 14 and 16 and a hook 24 secured to the end portion of it and is shown as having its point imbedded in the butt of the handle 10, the handle 20 being turned to place the line 22 under tension. This is the arrangement described above which is commonly resorted to by fishermen when they temporarily or otherwise discontinue their fishing activities and do not wish to disassemble the rod and reel. The hook 24 instead of being imbedded in the butt of the handle 10 may be imbedded in the body of the handle which is usually formed from cork or, and as will hereinafter be more fully described in connection with Fig. 4, may be engaged upon one of the pillars or cross-bars of the reel itself. In the particular case shown the hook 24 is provided with a snell 26 fastened to the line 22 in spaced relation to the end of the line and a sinker 28 is fastened to the end of the line and is shown in Fig. 1 as also being located at the butt end of the handle 10.

In accordance with the present invention a container or enclosure 30 of more or less baglike conformation is slipped over the outer end of the handle 10 in surrounding relation with respect thereto and with respect to the hook 24 and sinker 28 when positioned at the butt end thereof as shown in Fig. 1. The container 30 is preferably, but not necessarily, of a substantially cylindrical nature, as brought out in Fig. 3, and of such size as to preferably be freely received over the end of the handle 10 and extend to approximately the position shown in Fig. 1. The container 30 is provided with a straplike extension, strap or arm 32 projecting from the open end thereof. In the broader aspects of the invention either the container itself, the strap 32, or both, are longitudinally stretchable and resilient or elastic so as to be capable of being elongated or stretched and will return to its original length upon release of the stretching force. The strap 32 in the forms shown is formed from a resilient stretchable material such as rubber, but in the broader aspects may be replaced by a tension spring or equivalent if desired. The free end of the strap or arm 32 is formed or provided with means for engagement with one of the knobs on the end of the reel handle 20. The length of the container 30 is less than the distance between the butt end of the handle 10 and the reel 18 so that in order to engage the free end of the strap or arm 32 with one of the knobs on the handle 20 it is necessary to stretch the strap or arm 32, or the container, or both.

In applying the container 30 to the handle of the rod when the rod, reel and hook are in the position shown in Fig. 1, or an equivalent position, the strap or arm 32, the container 30, or both is or are stretched upon placement and the arm 32 engaged with one of the knobs of the handle 20. In the arrangement shown it will be appreciated that the handle 20 is turned in a conventional clockwise direction to wind up the line on the spool of the reel, and the spool turns in a counterclockwise direction under such conditions due to the gearing between the handle and the spool. The lower run of the line 22 shown in Fig. 1 leads to the spool. Thus the tension of the strap or arm 32, the container 30, or both, will tend to move the handle 20 in a direction to cause the reel 18 to further wind up the line 22 thereon. As will be appreciated the device of the present invention when thus applied will cause a tension to be continuously applied to the line 22 and unless the stretch in the device is excessive it will positively prevent the reel from unwinding more than a part of a turn if the line 22 becomes snagged on some foreign object.

Obviously the container 30 may be formed of any suitable material and be either rigid, as when formed of metal or the like, or flexible as when formed of fabric, rubber or the like. In the former case the arm 32 or its equivalent must be stretchable and in the latter case it does not necessarily have to be. Likewise the arm or strap 32 may be formed of any suitable material and be secured to the container 30 in any suitable way and provided for engagement with the handle of the reel in any suitable way. However, it is preferable and will usually be found more economical to form both the container 30 and the arm or strap 32 from a suitable grade of soft rubber and form them integrally with each other as illustrated in Fig. 2. In such case in order to engage the strap or arm 32 with one of the knobs of the handle 20 a hole 34 may be simply stamped out of or molded in the arm 32 of sufficient size to enable it to be slipped over one of the knobs on the handle 20, thus serving to secure its free end to the handle 20. A plurality of such holes may be employed to accommodate the length of the device to rods in which the reels are mounted at different distances from the butt end of the handle.

It is, of course, not necessary that the hook 24 be hooked into the handle 10 in holding the line 22 under tension in accordance with the present invention as it will be appreciated that in most cases regardless of whether the hook is engaged with the rod or reel the device of the present invention when utilized in connection therewith will maintain the line under tension. As a matter of illustration in Fig. 4 the same rod and reel arrangement as shown in Fig. 1 is illustrated but in this case the hook 24, instead of having its point imbedded in the butt end of the handle 10, is hooked around one of the posts 36 connecting the two end plates of the reel 18, thus to serve as an anchor for the hook. The strap or arm portion 32 is stretched and one of the knobs of the handle 20 is projected through the hole 24 thereof so as to constantly urge the reel to turn in the direction to maintain the tension on the line 22 and maintain the hook in engagement with the post 36. Where, as in the case shown, the sinker 28 is secured to the end of the line 22, then to prevent it from unrestrained movement it is preferably positioned between the bottom of the container 30 and the butt of the handle 10 as illustrated in Fig. 4. It might be noted at this point that where the container 30 is made of soft rubber the same as the strap or arm 32, then the container 30 itself will necessarily longitudinally stretch when the strap or arm 32 is stretched to engage with the handle 20, which is preferable inasmuch as by such an arrangement the device of the present invention when provided with only one hole 34 as shown more easily accommodates itself to rod and reel assemblies in which the distance from the butt of the rod to the reel varies.

Ordinarily it will not be desirable to form the container 30 of metal or of some rigid material incapable of being collapsed or folded as when formed of such yieldable material as rubber, fabric or the like and the device is not in use it may be folded or collapsed and carried in a pocket, fishing box or the like without any inconvenience and will occupy a minimum of space. A flexible fabric bag or container is just as advantageous in this respect as rubber.

A modified form of construction employing such fabric container is illustrated in Fig. 5 in which the container itself is illustrated at 30a and which may be substantially identical to the container 30 previously described except for the material from which it is made. In this case it will, of course, be necessary to form the strap or arm separately, preferably from rubber or other suitable elastic strip or device one end of which is suitably fixed to the container 30a. In the modified construction shown in Fig. 5 two such straps or arms each indicated at 32a are secured at one end to the container 30a but on diametrically opposite sides of the same. Each strap or arm 32a is provided with an opening 34a adjacent its free end for the same purpose as the hole 34 in the first described construction but it will be appreciated that in use only one of the arms 32a will engage the handle of the reel. The hook, equivalent to the hook 24 previously described, may be engaged with the hole 34a in the remaining strap or arm 32a with this construction and this may serve as a means for providing a greater flexing to the line 22 or the equivalent if the latter becomes snagged on some obstruction.

It will be appreciated from the foregoing that the device of the present invention is a simple device, readily applied and removed from the rod and reel assembly and thus by its use the associated line may be maintained under tension when not in use and it will aid in preventing tangling of the line with foreign objects or at least the disadvantageous results of such tangling. Furthermore, the device is of such character as to be convenient to carry, store, and the like.

Having thus described my invention, what I claim by Letters Patent is:

1. In combination with a fishing rod having guides and having a reel thereon having a handle and a line on the reel extended through the guides and having its free end anchored to a part of the assembly, a container element enveloping the butt end of said rod and an element interconnecting said container element and the handle of the reel, at least one of said elements being of an elastic character and placed under tension when applied as described, the second-mentioned element being so connected to the handle of the reel as to urge the reel in a direction of rotation tending to tighten said line.

2. In combination with a fishing rod having guides and having a reel thereon having a handle and a line on the reel extended through the guides and having its free end anchored to a part of the assembly, a container element enveloping the butt end of said rod and an element interconnecting said container element and the handle of the reel, the second-mentioned element being of elastic character and maintained under tension when said elements are applied to said rod as described.

3. In combination with a fishing rod having guides and having a reel thereon having a handle and a line on the reel extended through the guides and having its free end anchored to a part of the assembly, a container element enveloping the butt end of said rod and an element interconnecting said container element and the handle of the reel, said container element being formed of elastic material and being maintained under longitudinal tension when said elements are applied to said rod in the manner described.

4. An accessory for a fishing rod, reel and line assembly comprising an open ended container of a size to receive the butt end of the rod therein and an extension element secured at one end to the open end of said container, said extension element having means at the free end thereof for engaging the handle of the reel and one of said elements being of longitudinally elastic character.

5. An accessory for a fishing rod, reel and line assembly comprising an open ended container of a size to receive the butt end of the rod therein and a strap-like extension secured at one end to the open end of said container, said extension element having means at the free end thereof for engaging the handle of the reel and one of said elements being of longitudinally elastic character.

6. An accessory for a fishing rod, reel and line assembly comprising an open ended container of a size to receive the butt end of the rod therein and an extension element secured at one end to the open end of said container, said extension element having means at the free end thereof for engaging the handle of the reel and said container being formed of elastic material and being adapted to be maintained under longitudinal tension when applied to the butt end of a rod of a rod and reel assembly with the free end of said extension anchored to the handle of the reel.

7. An accessory for use in maintaining the line of a fishing rod and reel assembly under tension comprising an open ended container adapted to relatively closely but readily receive the butt end of the rod therein and a strap-like extension fixed at one end to the open end of said container, the opposite end of said extension being formed for engagement with the handle of the reel, said container and strap both being formed of an elastic material.

8. An accessory for maintaining the line of a fishing rod and reel assembly in stretched condition comprising, in combination, a bag-like container adapted to receive the butt end of a rod therein and having a strap-like extension projecting from the open end thereof and formed integrally therewith, said container and extension being formed of soft rubber and said extension having an aperture therein adjacent the free end thereof for receiving the knob of a fishing reel therein.

LEONARD J. ROSA.

REFERENCES CITED

The following references are of record in the file of this patent:

UNITED STATES PATENTS

| Number | Name | Date |
| --- | --- | --- |
| 309,028 | Byington | Dec. 9, 1884 |
| 2,095,048 | Aiken | Oct. 5, 1937 |
| 2,401,886 | Shelton | June 11, 1946 |